United States Patent [19]
Allen

[11] Patent Number: 5,913,083
[45] Date of Patent: Jun. 15, 1999

[54] CAMARA-TO-FLASH UNIT ATTACHMENT ASSEMBLY

[75] Inventor: Michael R. Allen, Churchville, N.Y.

[73] Assignee: Eastman Kodak Company, Rochester, N.Y.

[21] Appl. No.: 09/002,957

[22] Filed: Jan. 6, 1998

[51] Int. Cl.[6] .................................................. G03B 15/03
[52] U.S. Cl. ............................ 396/176; 396/6; 396/155; 396/535; 362/16
[58] Field of Search ............................... 396/6, 176, 535; 362/16

[56] References Cited

U.S. PATENT DOCUMENTS

| | | |
|---|---|---|
| 3,071,681 | 1/1963 | Schmidt et al. . |
| 4,110,770 | 8/1978 | Lange et al. . |
| 4,317,625 | 3/1982 | Allen . |
| 4,356,533 | 10/1982 | Takematsu . |
| 4,460,942 | 7/1984 | Pizzuti et al. . |
| 4,555,648 | 11/1985 | Iida et al. . |
| 4,570,203 | 2/1986 | Daniels et al. . |
| 5,047,792 | 9/1991 | Asano et al. . |
| 5,047,900 | 9/1991 | DiRisio . |
| 5,146,251 | 9/1992 | Ishii et al. . |
| 5,436,685 | 7/1995 | Yamashima . |
| 5,541,687 | 7/1996 | Pearson . |
| 5,669,024 | 9/1997 | Ohta et al. ............................ 396/176 |

FOREIGN PATENT DOCUMENTS

| | | |
|---|---|---|
| 4-120945 | 10/1992 | Japan . |
| 5-165085 | 6/1993 | Japan . |
| 6-194724 | 7/1994 | Japan . |
| 7-191385 | 7/1995 | Japan . |

*Primary Examiner*—Russell Adams
*Attorney, Agent, or Firm*—Roger A. Fields

[57] ABSTRACT

A flash camera comprising a main body part and an electronic flash unit connected together, is characterized in that the main body part has a mount for the flash unit that is provided with an engageable portion and at least one locator portion, and the flash unit has an engageable portion for engaging with the engageable portion of the mount that projects rearwardly from the flash unit and at least one locator portion for mating with the locator portion of the mount that projects rearwardly from the flash unit, parallel to and farther than the engageable portion of the flash unit, to permit the locator portion of the flash unit to mate with the locator portion of the mount before the engageable portion of the flash unit can engage with the engageable portion of the mount.

6 Claims, 4 Drawing Sheets

CAMARA-TO-FLASH UNIT ATTACHMENT ASSEMBLY

FIELD OF THE INVENTION

The invention relates generally to the field of photography, and in particular to cameras. More specifically, the invention relates to a camera-to flash unit attachment assembly.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a conventional film cartridge in a cartridge receiving chamber, a film take-up spool in a film supply chamber, a fixed-focus taking lens, a film metering mechanism with a rotatably supported metering sprocket that engages successive sections of the filmstrip at a backframe (exposure) opening, a manually rotatable thumbwheel rotatably engaged with a film spool inside the film cartridge, a single-blade shutter, a manually depressible shutter release button, a resilient cantilevered support for the shutter release button, a rotatable frame counter for indicating the number of exposures remaining to be made on the filmstrip, a direct see-through viewfinder, and in some models an electronic flash unit. A pair of plastic front and rear cover parts house the main body part between them to complete the camera. The rear cover part connects to the main body part and/or to the front cover part to make the main body part light-tight. A decorative cardboard outer box or label at least partially covers the camera and has respective openings for the taking lens, etc.

After each picture is taken with the one-time-use camera, the photographer manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound off the take-up spool and into the film cartridge, the one-time-use camera is given to a photofinisher who tears the outer box off the camera, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

Typically, the electronic flash unit is connected to the main body part during original manufacture or remanufacture of the one-time-use camera. As shown in U.S. Pat. No. 5,047,792 issued Sep. 10, 1991 the flash unit is attached to the main body part via a hook that projects from the main body part through a hole in the flash circuit board.

At times as shown in U.S. Pat. No. 4,460,942 issued Jul. 17, 1984 the electronic flash unit can comprise a housing that has an open front, a light-transmissive cover connected to the housing to cover the open front, and a reflector insert and flash tube positioned inside the housing for the reflector insert to reflect light emitted from said flash tube through said cover.

SUMMARY OF THE INVENTION

According to one aspect of the invention, an electronic flash unit comprising a housing that has an open front, a light-transmissive cover connected to the housing to cover the open front, and a reflector insert and flash tube positioned inside the housing for the reflector insert to reflect light emitted from the flash tube through the cover, is characterized in that:

the housing has an attachment hook that projects rearwardly from the housing and at least one locator pin that projects rearwardly from the housing, parallel to and farther than the attachment hook, to permit the locator pin to enter a corresponding opening in a camera part before the attachment hook can engage a complementary shaped structure of the camera part.

According to another aspect of the invention, a flash camera comprising a main body part and an electronic flash unit connected together, is characterized in that:

the main body part has a mount for the flash unit that is provided with an engageable portion and at least one locator portion; and the flash unit has an engageable portion for engaging with the engageable portion of the mount that projects rearwardly from the flash unit and at least one locator portion for mating with the locator portion of the mount that projects rearwardly from the flash unit, parallel to and farther than the engageable portion of the flash unit, to permit the locator portion of the flash unit to mate with the locator portion of the mount before the engageable portion of the flash unit can engage with the engageable portion of the mount.

DETAILED DESCRIPTION OF THE INVENTION

Figure 1:
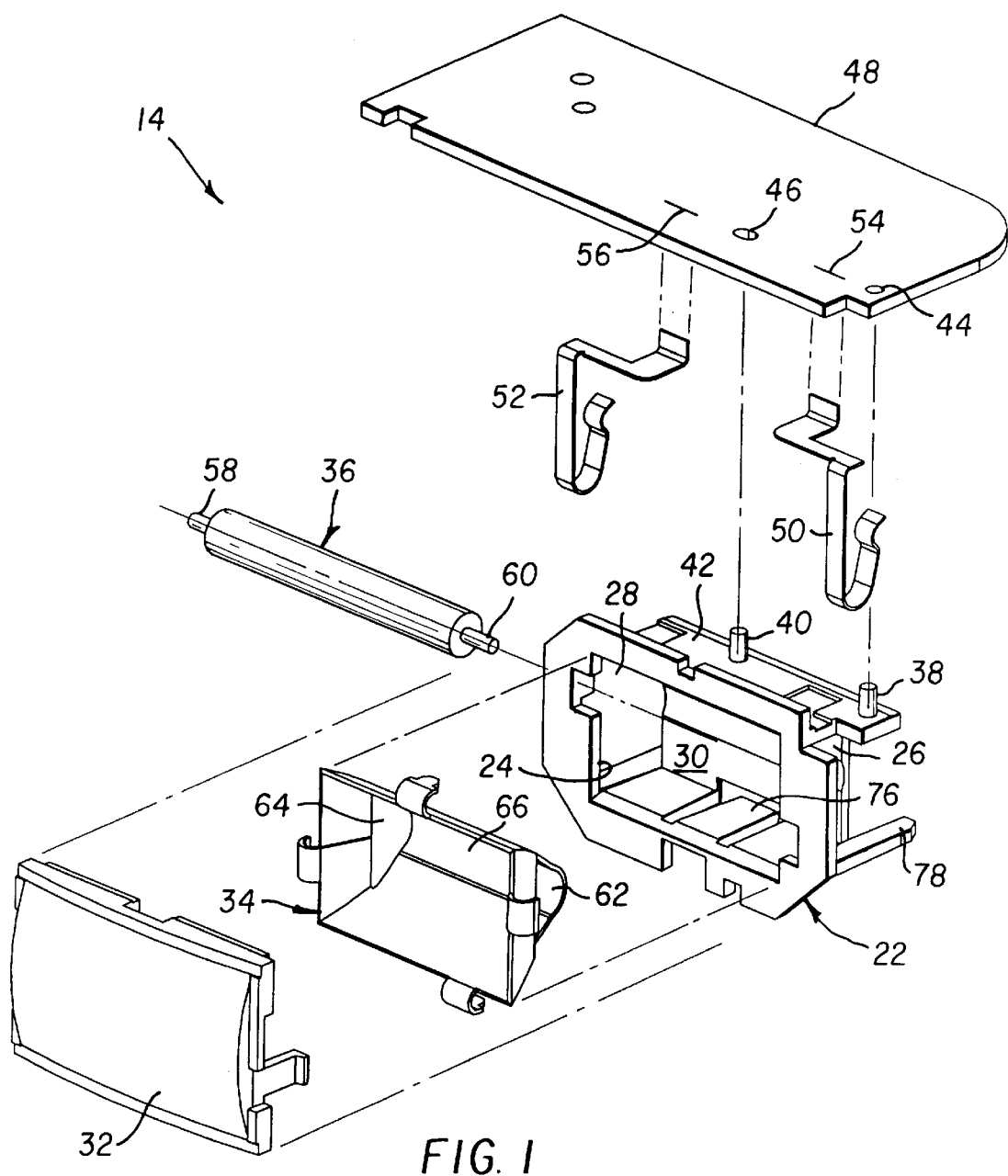
FIG. 1 is an exploded top perspective view of a preferred embodiment of an electronic flash unit.

The invention is disclosed as being embodied preferably in a one-time-use flash camera. Because the features of a such a camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–5 partially show a one-time-use flash camera 10 which includes a plastic main body part 12 and an electronic flash unit 14.

Figure 4:
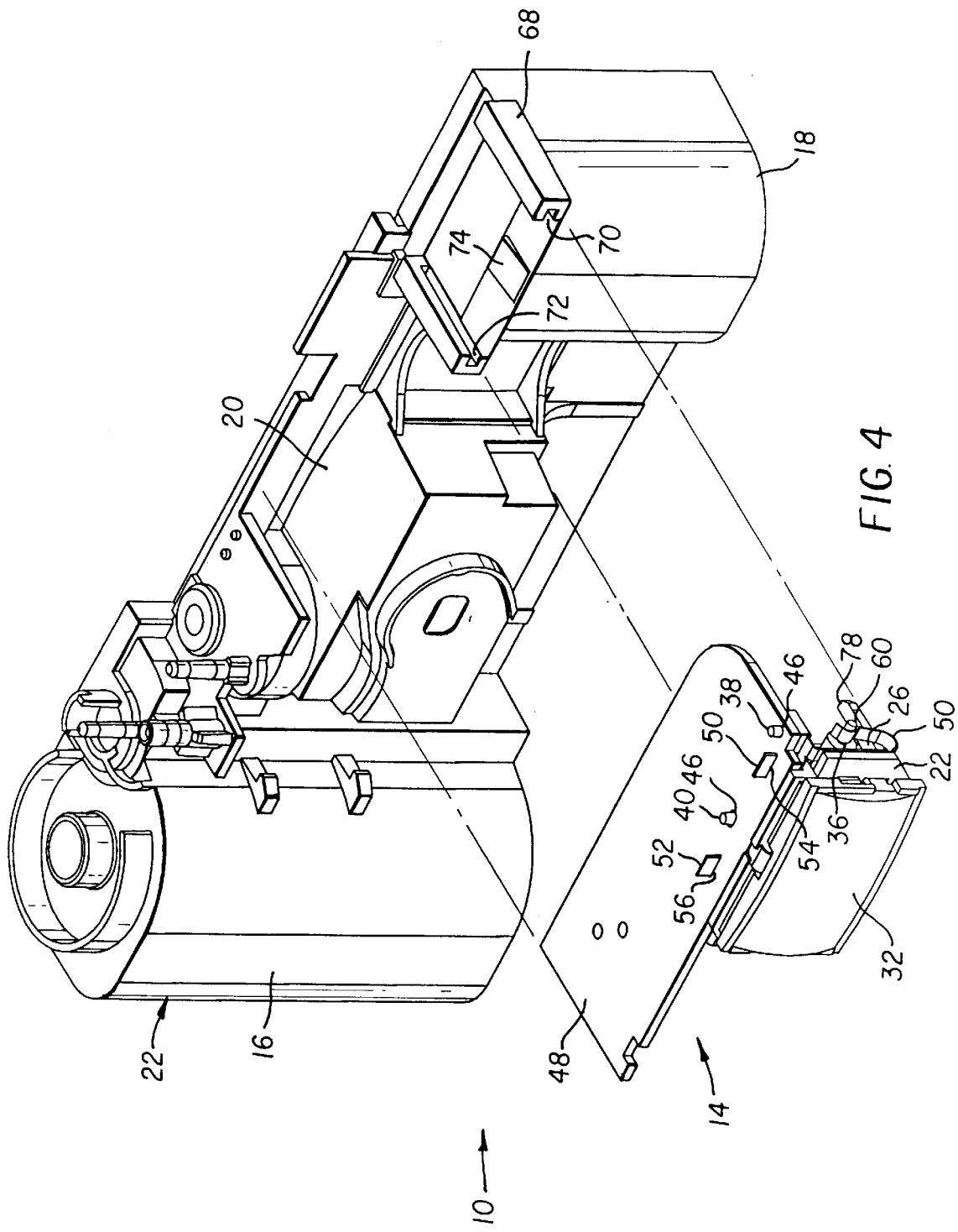
FIG. 4 is an exploded top perspective view of the electronic flash unit and a main body part of a one-time-use camera.
Figure 5:
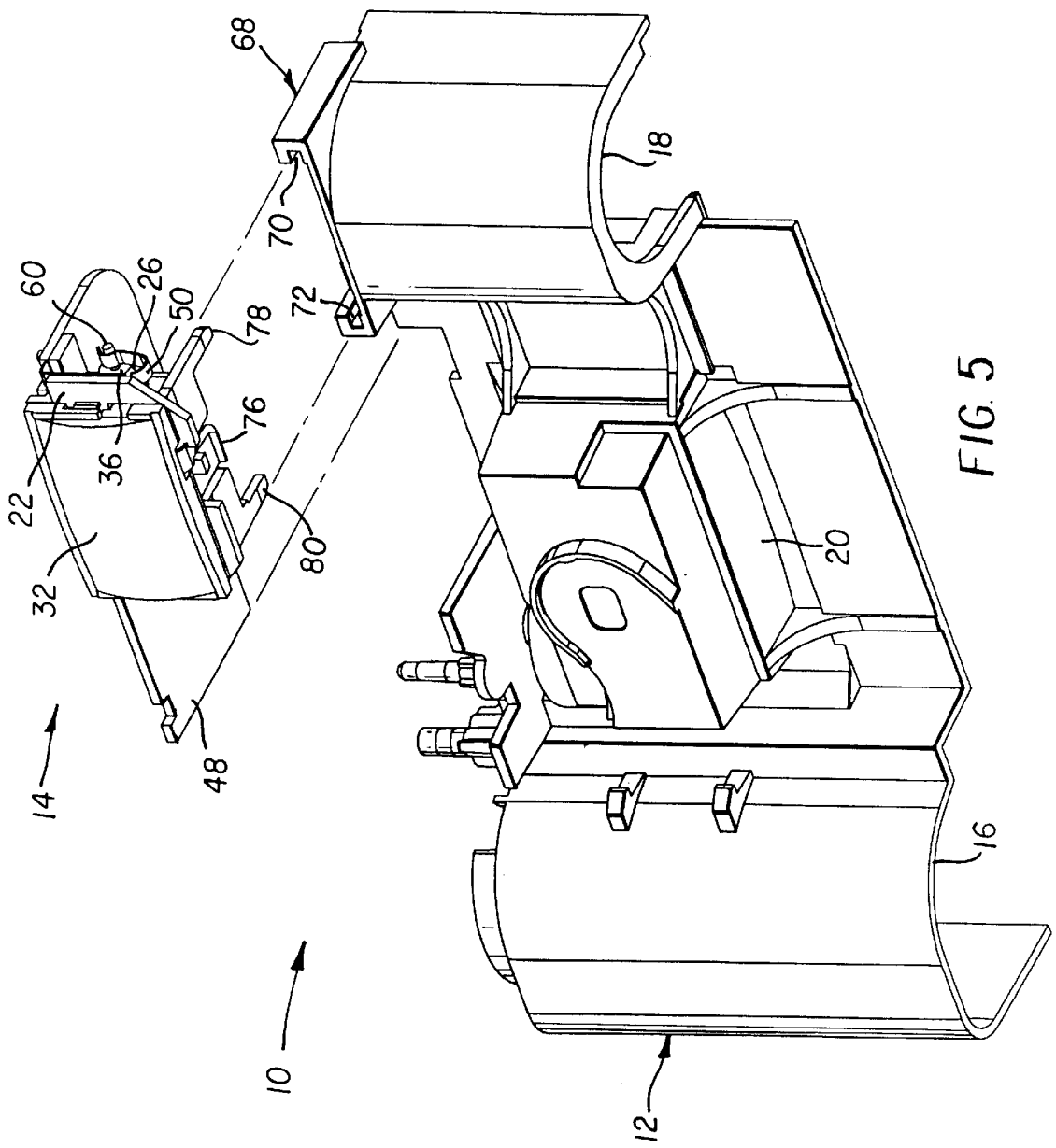
FIG. 5 is an exploded bottom perspective view of the electronic flash unit and the main body part of the one-time-use camera.

The main body part, shown in FIGS. 4 and 5, has a cartridge receiving chamber 16, a film roll chamber 18, and an exposure chamber 20 at which successive sections of a filmstrip (not shown) advanced from an unexposed film roll (not shown) in the film roll chamber are exposed. Once exposed, each film section is advanced into a film cartridge (not shown) in the cartridge receiving chamber 16.

Figure 2:
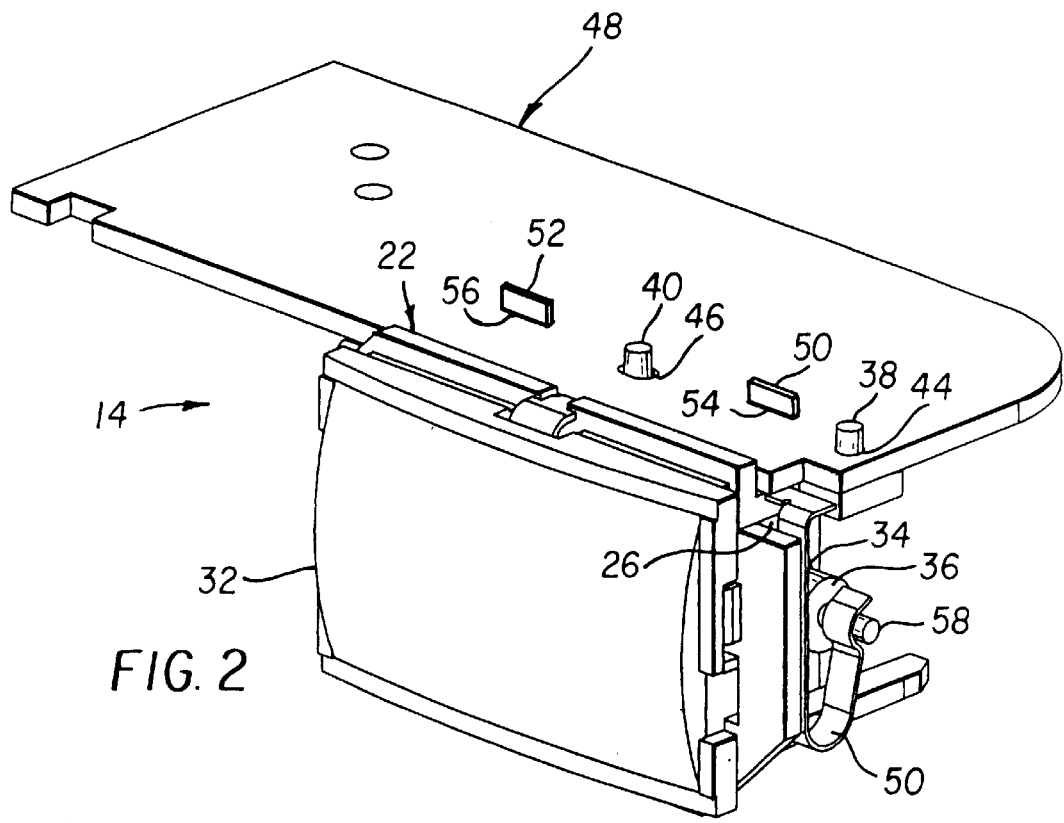
FIG. 2 is an assembled top perspective view of the electronic flash unit.
Figure 3:
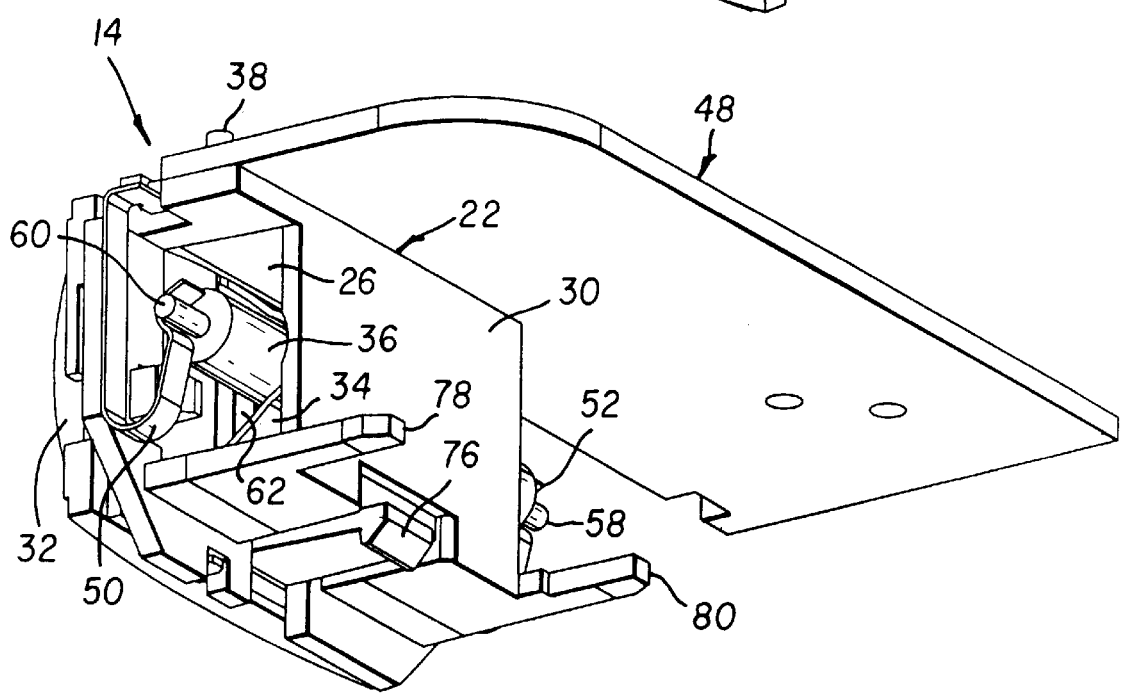
FIG. 3 is an assembled bottom perspective view of the electronic flash unit.

The flash unit 14 includes a plastic housing 22 that has an open front 24, a pair of open opposite sides 26 and 28, and a closed back 30. A plastic light-transmissive cover 32 is connected to the housing 22 to cover the open front 24 of the housing. An aluminum reflector insert 34 and a glass flash tube 36 are positioned inside the housing 22 for the reflector insert to reflect light emitted from the flash tube through the cover 32. See FIGS. 1–3. A pair of locator posts 38 and 40 project from a top face 42 of the housing 22, through respective locator holes 44 and 46 in a substantially flat flash circuit board 48, to be sonic-weld connected to the flash circuit board. The flash circuit board 48 extends rearwardly and sideways of the housing 22 as shown in FIGS. 2 and 3. A pair of resilient metal support-contacts 50 and 52 depend from respective slits 54 and 56 in the flash circuit board 48 to adjacent the open sides 26 and 28 of the housing 22 and engage anode and cathode end-terminals 58 and 60 of the flash tube 36 that protrude from open opposite sides 62 and 64 of the reflector insert 34, to electrically connect the anode and cathode end-terminals with the flash circuit board and to urge the flash tube firmly against a concave inside rear 66 of the reflector insert. A triggering lead wire (not shown) interconnects the reflector insert 34 and the flash circuit board 48, in a known way, to allow the reflector insert to serve as a triggering electrode.

The main body part 12 has a mount 68 for the flash unit 14 that is positioned atop the film roll chamber 8 and is provided with a pair of parallel pin receiving slots 70 and 72 and a hook engagement 74 located between the two slots. The housing 22 has an attachment hook 76 for engaging the hook engagement 74 that projects rearwardly from the housing and a pair of locator pins 78 and 80 for being received in the pin receiving slots 70 and 72 that project rearwardly from the housing, parallel to and farther than the attachment hook, to permit the locator pins to enter the pin receiving slots before the attachment hook can engage with the hook engagement. See FIGS. 3–5.

Once the flash unit 14 including the flash circuit board 48 is assembled as shown in FIGS. 2 and 3, it is engaged with the mount 68 as shown in FIGS. 4 and 5. The flash unit 14 is, thus, positioned on top of the mount 68, with the flash circuit board 48 extending partially over the exposure chamber 20.

The invention has been described with reference to a preferred embodiment. However, it will be appreciated that variations and modifications can be effected by a person of ordinary skill in the art without departing from the scope of the invention.

PARTS LIST 10. one-time-use flash camera
12. main body part
14. electronic flash unit
16. cartridge receiving chamber
18. film roll chamber
20. exposure chamber
22. housing
24. open front
26. open side
28. open side
30. closed back
32. cover
34. reflector insert
36. flash tube
38. locator post
40. locator post
42. top face
44. locator hole
46. locator hole
48. flash circuit board
50. support-contact
52. support-contact
54. slit
56. slit
58. anode end-terminal
60. cathode end-terminal
62. open side
64. open side
66. concave inside rear
68. mount
70. pin receiving slot
72. pin receiving slot
74. hook engagement
76. attachment hook
78. locator pin
80. locator pin

What is claimed is:

1. An electronic flash unit comprising a housing that has an open front, a light-transmissive cover connected to said housing to cover said open front, and a reflector insert and flash tube positioned inside said housing for said reflector insert to reflect light emitted from said flash tube through said cover, is characterized in that:

said housing has an attachment hook that projects rearwardly from the housing and at least one locator pin that projects rearwardly from the housing, parallel to and farther than said attachment hook, to permit said locator pin to enter a corresponding opening in a camera part before said attachment hook can engage a complementary shaped structure of the camera part.

2. An electronic flash unit as recited in claim 1, wherein said housing has a top face, and a flash circuit board is connected to said top face to permit said flash circuit board and the housing to be secured in unison to the camera part.

3. A flash camera comprising a main body part and an electronic flash unit connected together, is characterized in that:

said main body part has a mount for said flash unit that is provided with an engageable portion and at least one locator portion; and said flash unit has an engageable portion for engaging with said engageable portion of said mount that projects rearwardly from the flash unit and at least one locator portion for mating with said locator portion of the mount that projects rearwardly from the flash unit, parallel to and farther than said engageable portion of the flash unit, to permit said locator portion of the flash unit to mate with said locator portion of the mount before said engageable portion of the flash unit can engage with said engageable portion of the mount.

4. A flash camera as recited in claim 3, wherein said flash unit has a substantially flat flash circuit board positioned to project rearwardly from the flash unit and parallel to said engageable portion and locator portion of the flash unit in order to extend over said mount.

5. A flash camera as recited in claim 3, wherein said main body part has a film roll chamber, and said mount is positioned atop said film roll chamber to locate said flash unit at least part way over the film roll chamber.

6. A flash camera comprising a main body part and an electronic flash unit connected together, is characterized in that:

said main body part has a mount for said flash unit that is provided with a pair of parallel pin receiving slots and a hook engagement located between said pin receiving slots; and said flash unit has an attachment hook for engaging with said hook engagement of the mount that projects rearwardly from the flash unit and a pair of locator pins for being received in said pin receiving slots of the mount that project rearwardly from the flash unit, parallel to and farther than said attachment hook of the flash unit, to permit said locator pins of the flash unit to enter said pin receiving slots of the mount before said attachment hook of the flash unit can engage with said hook engagement of the mount.

* * * * *